United States Patent [19]

Takashina et al.

[11] 4,329,269

[45] May 11, 1982

[54] ONE PACKAGE SYSTEM COLD-SETTING TYPE COATING COMPOSITIONS

[75] Inventors: Naomitsu Takashina, Yokohama; Masahiro Shimoi, Hiratsuka; Yoshinori Iwamoto, Odawara, all of Japan

[73] Assignee: Mitsubishi Gas Chemical Company, Inc., Tokyo, Japan

[21] Appl. No.: 225,516

[22] Filed: Jan. 16, 1981

[30] Foreign Application Priority Data

Jan. 16, 1980 [JP] Japan ................................ 55-3207

[51] Int. Cl.³ ............................................. C08K 5/07
[52] U.S. Cl. ................................ 525/366; 525/370; 525/383; 525/384
[58] Field of Search .............. 260/22 T, 22 A, 31.2 R, 260/33.2 R

[56] References Cited

U.S. PATENT DOCUMENTS

| | | | |
|---|---|---|---|
| 3,632,546 | 1/1972 | Haung | 260/31.2 R |
| 3,822,232 | 7/1974 | Haung | 260/31.2 R |
| 3,904,572 | 9/1975 | Haung | 260/33.2 R |
| 4,058,497 | 11/1977 | Ko | 260/31.2 R |

*Primary Examiner*—Paul R. Michl
*Attorney, Agent, or Firm*—Browdy and Neimark

[57] ABSTRACT

This invention relates to a one-package system cold-setting type coating composition which comprises an acrylic copolymer having carboxyl groups in its molecule or an alkyd resin, an aluminum alkoxide complex, a keto-enol tautomeric compound, a solvent and at least one alkali metal hydroxide.

4 Claims, No Drawings

ONE PACKAGE SYSTEM COLD-SETTING TYPE COATING COMPOSITIONS

BACKGROUND OF THE INVENTION

This invention relates to a one-package system cold-setting type coating composition which comprises (i) an acrylic copolymer having carboxyl groups in its molecule or an alkyd resin, (ii) an aluminum alkoxide complex, (iii) a keto-enol tautomeric compound, (iv) a solvent and (v) an alkali metal hydroxide.

In general, acrylic coating compositions comprise an acrylic ester or a methacrylic ester as a main component and have excellent resistance to chemicals and weather and transparency. Their adhesive property, flexibility and hardness can be unrestrictedly controlled by copolymerizing other vinylic monomers therewith. Therefore, recently the use of acrylic coating compositions have increased more and more. Particularly, acrylic coatings with a three-dimensional structure obtained by curing the acrylic ester and/or the methacrylic ester have hard and tough properties and other excellent properties.

In general, coating compositions having hard and tough properties have been made by heating an acrylic resin and an amino resin, such as a urea resin, melamine resin or benzoguanamine resin at an elevated temperature.

Also, an acrylic resin which can give rise to three-dimensional cure at a room temperature as well as at a low temperature has been used in such particular use that a substrate to be coated or an environment of the coating step cannot be heated. In this case a so-called two packages system coating composition comprising an acrylic resin and a curing agent, such as isocyanate has generally been used. The method of carrying out cold-setting coating by using such a two-packages system coating composition, however, has the following disadvantages:

(a) Pot life after mixing a curing agent with a resin is short, (b) Maintenance of the coating apparatus is complicated, and (c) handling of the composition is inconvenient.

In order to overcome these disadvantages, research has been made as to acrylic coating compositions which are curable at a low temperature and which, when cured, can form a film with excellent resistance to chemicals, weather and solvent.

As a result, a one-package system cold-setting type acrylic coating composition having the excellent properties as mentioned above has been obtained by mixing a linear acrylic copolymer having carboxyl groups in its molecule, an aluminum alkoxide complex, a keto-enol tautomeric compound and a solvent as disclosed in U.S. Pat. No. 3,632,546 by Huang et al. which was assigned to the assignee of this application and which is incorporated herein.

Mechanism of a one-package system cold-setting type coating composition which comprises an acrylic copolymer having carboxyl groups in its molecule or an alkyd resin, an aluminum alkoxide complex, a keto-enol tautomeric compound and a solvent is not clear. It is believed that equilibrium between an aluminum alkoxide complex and a keto-enol tautomeric compound is formed in the composition.

That is, when mixing an aluminum alkoxide complex and a keto-enol tautomeric compound, it is believed that the following equilibrium is formed:

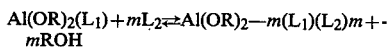

$$Al(OR)_2(L_1) + mL_2 \rightleftarrows Al(OR)_{2-m}(L_1)(L_2)_m + mROH$$

wherein R is alkyl; $L_1$ is keto-enol tautomeric compound, or a compound which can form complex with aluminum alkoxide, for example propanediol or derivative thereof, or a salicyloyl derivative, such as salicylic ester or salicyl aldehyde; $L_2$ is keto-enol tautomeric compound; m is integer of 1 or 2. The coating composition is stable in the presence of the keto-enol tautomeric compound and the solvent, because the above equilibrium is maintained. However, when the coating composition is coated on the substrate, the keto-enol tautomeric compound and the solvent evaporate, whereby the composition gives rise to three-dimensional cure to form a hard and tough film having excellent properties.

Alkyd resin coating compositions comprise a polycondensate of a polyhydric alcohol and a polybasic acid as a main component. The properties and performances of the alkyd resin coating compositions can be varied widely by selecting the kinds of each of the polyhydric alcohol and polybasic acid or by adding a modifier, such as a fatty acid to the alkyd resin. In addition, the alkyd resin is low-priced. Therefore, recently a large amount of the alkyd resin has been used. Alkyd resins are classified into two large groups, thermo-setting type alkyd resin and cold-setting type alkyd resin. The former is classified into two groups according to the method for crosslinking, that is, into the method for heat-curing the alkyd resin through oxidation polymerization of the unsaturated fatty acid groups in the alkyd resin and the method for heat-curing the alkyd resin which comprises adding a urea resin or a melamine resin to the alkyd resin and allowing the crosslinking between the alkyd resin and the additive to occur. While the cold-setting type alkyd resin is cured by adding a large amount of drying oil, semi-drying oil or unsaturated fatty acids therefrom to the alkyd resin, followed by curing the mixture in the presence of a catalyst, such as compound of cobalt, manganese or lead at a room temperature. However, discoloration of coating film cannot be avoided in the coating composition containing the cold-setting type alkyd resin, because a large amount of drying oil, semi-drying oil or unsaturated fatty acids therefrom and a large amount of the metallic catalyst are present in the coating composition.

In order to avoid discoloration of the coating film caused by addition of a large amount of drying oil, semi-drying oil or unsaturated fatty acids and a large amount of the metallic catalyst, a one-package system cold-setting type coating composition may be prepared by incorporating the aluminum alkoxide compound and the keto-enol tautomeric compound as disclosed in U.S. Pat. No. 3,632,546 with the alkyd resin having a suitable acid value without using a large amount of drying oil, semi-drying oil or unsaturated fatty acids and a large amount of the metallic catalyst.

Nevertheless, when a one-package system cold-setting type acrylic coating composition or a one-package system cold-setting type alkyd resin coating composition containing the crosslinking agent as disclosed in U.S. Pat. No. 3,632,546 was coated on steel, particularly polished steel, it was found that discoloration of the coating film may occur. The undesirable discoloration of the coating film does not always occur. Whether or not the discoloration occurs depends on conditions under which the composition is coated, that is, the temperature and the humidity of coating environment, and the kinds of solvent employed. The higher the temperature or the humidity of the coating environment, the more striking the extent to which such discoloration occurs. Similarly, the thicker the coating of film is on the steel, the more striking the discoloration. Such discoloration occurs during the initial period of the coating step of the composition and the drying step.

In the specification, the term "discoloration of coating film" or "discoloration of coated substance" means the fact that undesirable color develops in the film or substance.

Two of the present inventors and other members who were all employees of the assignee of this application have found that such discoloration can be overcome by adding a nigrogen compound to the one-package system cold-setting type acrylic coating composition as disclosed in U.S. Pat. No. 3,632,546. Please refer to U.S. Pat. No. 4,058,497 patented on Nov. 15, 1977 which was assigned to the assignee of this application and which is incorporated herein. Though the addition of nitrogen compound to the composition as disclosed in U.S. Pat. No. 3,632,546 can prevent the discoloration of the coating film from occurring the physical properties of the coating film are lowered.

SUMMARY OF THE INVENTION

We have found that when small amount of an alkali metal hydroxide is added to the composition as disclosed in U.S. Pat. No. 3,632,546, such discoloration of coating film can be prevented and the physical properties of the coating film are not lowered.

An object of this invention is to provide an acrylic coating composition or an alkyd resin coating composition which is coated on a steel surface without discoloration.

Another object of this invention is to provide a one-package system cold-setting type coating composition which can provide a coating film having excellent physical properties.

This invention relates to a one-package system cold-setting type coating composition which comprises (i) an acrylic copolymer having carboxyl groups in its molecule or an alkyd resin, (ii) an aluminum alkoxide complex, (iii) a keto-enol tautomeric compound, (iv) a solvent and (v) from about 0.01 to about 1.0 percent by weight of at least one alkali metal hydroxide based on the weight of the composition comprising (i), (ii), (iii) and (iv).

DETAILED DESCRIPTION OF THE INVENTION

In the specification and the claims, the term "acrylic copolymer having carboxyl groups in its molecule" means a copolymer of ethylenic monomers, diene monomers or mixture thereof and at least one unsaturated carboxylic acid as disclosed in U.S. Pat. No. 3,632,546. Typical examples of ethylenic monomers and diene monomers include ethylene, propylene, butadiene, isoprene, chloroprene, styrene, α-methylstyrene, dimethylstyrene, vinyltoluene, vinyl acetate, vinyl propionate vinyl ether, vinyl chloride, vinylidene chloride, methylacrylate, ethylacrylate, n-butylacrylate, iso-butylacrylate, 2-ethylhexylacrylate, laurylacrylate, methylmethacrylate, ethylmethacrylate, n-butyl-methacrylate, iso-butylmethacrylate, 2-ethylhexyl-methacrylate, and laurylmethacrylate. Typical examples of the unsaturated carboxylic acids include acrylic acid, methacrylic acid, crotonic acid, itaconic acid and maleic anhydride.

In the specification and the claims, the term "alkyd resin" means a resin having an acid value of at least 30 which comprises a polycondensate of a polyhydric alcohol and a polybasic acid. If necessary, the alkyd resin may contain modifiers, such as oil, fat or fatty acids therefrom, or other monobasic acids. Typical examples of polyhydric alcohols include ethylene glycol, propylene glycol, diethylene glycol, dipropylene glycol, butanediol, glycerol, trimethylolethane, pentanediol, neopentyl glycol, hexanediol, trimethylolpropane, pentaerythritol, diglycerol, and sorbitol. Typical examples of polybasic acids include malonic acid, succinic acid, glutaric acid, adipic acid, azelaic acid, sebacic acid, maleic acid, fumeric acid, phthalic acid, tetrahydrophthalic acid, hexahydrophthalic acid, isophthalic acid, terephthalic acid, trimellitic acid, pyromellitic acid, and diglycolic acid. Typical examples of oil or fat include linseed oil, soybean oil, coconut oil, tung oil, dehydrated castor oil and safflower oil. Typical examples of other monobasic acids include abietic acid and benzoic acid. In case of using a resin having an acid value of less than 30, a crosslinking reaction does not occur sufficiently, and therefore the coating film having exposed film performance can not be obtained.

An acrylic copolymer having carboxyl groups in its molecule is preferred as a resin component for a one-package system cold-setting type coating composition.

A solvent employed in this invention is selected from the group consisting of alcohols, aromatic hydrocarbons, esters, ketones, and the like. Typical examples of the solvents include benzene, toluene, xylene, methylethyl ketone, methylisobutyl ketone, propanol, isopropanol, n-butanol, iso-butanol, ethylacetate, n-butylacetate and 2-methoxyethanol.

An aluminum alkoxide complex employed in the present invention can be obtained by reacting an aluminum alkoxide with a keto-enol tautomeric compound selected from the group consisting of methylacetoacetate, ethylacetoacetate, diethylmalonate, dibutylmalonate, acetylacetone, ethyldiacetylacetate, benzoylacetone and dibenzoylmethane; a 1,3-propanediol selected from the group consisting of 1,3-propanediol, 2,2-dimethyl-1,3-propanediol, trimethylolpropane, 1,3-butanediol and 2,4-pentanediol; or a salicylic compound selected from the group consisting of salicylic acid esters and salicylaldehyde. The aluminum alkoxide is represented by the formula

wherein $R_{10}$ may be the same or different and is alkyl having 1-8 carbon atoms.

In this reaction, one or more of three alkoxide groups of the aluminum alkoxide is substituted with residue of the keto-enol tautomeric compound, the 1,3-propanediol, or the salicylic compound. For example, when one alkoxide group of the aluminum alkoxide is substituted with the residue, the reaction is shown in the following:

-continued

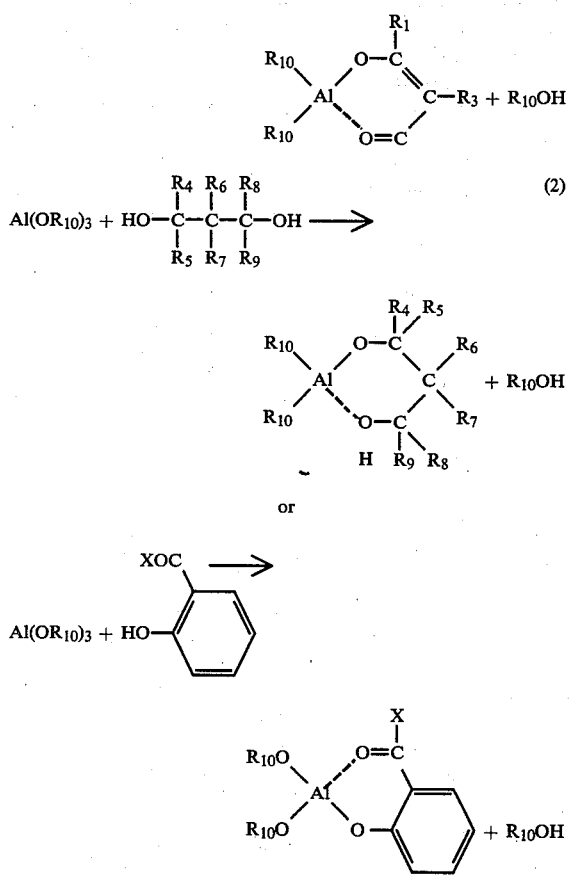

wherein $R_{10}$ represents the same or a different alkyl group having 1 to 8 carbon atoms, $R_{11}$ and $R_{12}$ mean the same or a different alkoxyl or alkyl group having 1 to 4 carbon atoms or

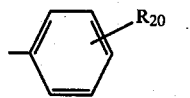

in which $R_{10}$ indicates hydrogen or an alkyl group having 1 to 4 carbon atoms, $R_{13}$ is selected from the group consisting of hydrogen and $-COOR_{21}$ in which the $R_{21}$ is the same as $R_{20}$, $R_{14}$, $R_{15}$, $R_{16}$, $R_{17}$, $R_{18}$ and $R_{19}$ are each selected from the group consisting of hydrogen, an alkyl group having 1 to 4 carbon atoms and $-OR_{22}$ in which $R_{22}$ is the same as $R_{20}$, and $R_{16}$, $R_{17}$ may be $-CH_2OH$, X is hydrogen or $-OR_{23}$ in which $R_{23}$ is alkyl having 1 to 4 carbon atoms. The aluminum alkoxide complex may be used in such an amount that equivalent ratio of alkoxide group of the aluminum alkoxide complex to carboxylic group of the acrylic copolymer or the alkyd resin is between 0.5 to 2.5.

Examples of the keto-enol tautomeric compound employed for the stabilization of the coating composition of this invention include methylacetoacetate, ethylacetoacetate, diethylmalonate, dibutylmalonate, acetylacetone, ethyldiacetylacetate, benzoylacetone or dibenzoylmethane, acetyl acetone is preferred. The keto-enol tautomeric compound as a stabilizer may be used in amount of 0.3-5 moles per mole of aluminum alkoxide complex.

When a keto-enol tautomeric compound is used for preparing an aluminum alkoxide complex, the following equation is given:

wherein $L_1$ is keto-enol tautomeric compound. In this case unreacted tautomeric compound is remaining in the system. In the coating composition of this invention further keto-enol tautomeric compound is added to the composition as a stabilizer. The keto-enol tautomeric compound employed as a stabilizer may be the same as or different from the keto-enol tautomeric compound employed for preparing the aluminum alkoxide complex.

An alkali metal hydroxide employed in this invention is selected from hydroxides of lithium, sodium potassium, rubidium, cesium and francium. Sodium hydroxide, potassium hydroxide and lithium hydroxide are preferred. The solid alkali metal hydroxide may be directly added to the composition comprising components (i), (ii), (iii) and (iv). A solution of the alkali metal hydroxide in water or an alcohol may be added to the composition. The alkali metal hydroxide may be added to the composition before the coating step. Alternatively, the alkali metal hydroxide may be added to the composition beforehand.

The reason why the coating composition of this invention does not cause undesirable discoloration and gives excellent coating film is assumed to be the following: When a coat composition comprising components (i), (ii), (iii) and (iv) is coated on an iron substrate, chelate between the keto-enol tautomeric compound and the iron substrate. The chelate gives rise to discoloration. However, an alkali metal hydroxide is contained in the composition, the alkali metal hydroxide prevents the chelate from being formed or decomposes the chelate formed, whereby the formation of chelate which causes the discoloration is prevented. Even when small amount of an alkali metal hydroxide is incorporated in the composition comprising components (i)–(iv), it exhibits the above effectiveness. Therefore, the use of alkali metal hydroxide does not impairs stability of the coated film and physical properties thereof. When the alkali metal hydroxide employed is too much, viscosity of the coating composition increases and impairs stability of the coated film. When amount of the metal hydroxide employed is too very small, it does not sufficiently exhibit the above effectiveness. So amount of the alkali metal hydroxide employed is in the range of about 0.01 to about 1.0 percent by weight, preferably about 0.05 to about 0.5 percent by weight based on the weight of the composition comprising components (i), (ii), (iii) and (iv).

As mentioned above, the coating composition of the present invention provides an excellent coating film which does not have undesired color even when it is coated under various coating conditions. The coating composition of the present invention is usable as a clear varnish as well as enamel paint containing any pigments.

Though the coating composition of the present invention is a cold-setting type one and it is not required to heat the composition for curing, the composition may be heated for curing within a short time. Also, after it is cured at a room temperature, the resulting dry film may be heated for improving the properties of the film.

The present invention is further illustrated by the following Examples. However, this invention should not be limited by these examples, and the changes and modifications within the spirit and scope of the claims can be effected. The percent and parts in the Examples are based on the weight unless otherwise specified.

EXAMPLE 1

Into a reactor equipped with thermometer, stirrer, condenser and dropping funnel were introduced 474 parts of toluene and 158 parts of n-butanol. The reactor was purged with nitrogen. The contents were heated to reflux on an oil bath of 130° C. After reflux starts, a mixture of 382 parts of styrene, 488 parts of butyl acrylate, 95 parts of methacrylic acid and 11.3 parts of dicumyl peroxide as a polymerization initiator was added dropwise thereto over three hours, and the resulting mixture was maintained at reflux temperature for an additional 10 hours period. Thereafter the polymerization conversion reached about 100%. Into the reactor was added 322 parts of a mixed solvent consisting of 75% of toluene and 25% of n-butanol, whereby the mixture was diluted until the concentration of non-volatile material reached 50%. A colorless clear resin solution having a viscosity of $3 \times 10^3$ centipoise was obtained. To the resulting resin solution was added 140.4 parts of acetylacetone, and the resulting mixture was stirred. 570 Parts of a 30% solution of aluminum alkoxide dicomplex produced by reacting one mole of aluminum isopropoxide with two moles of ethyl acetoacetate in isopropyl alcohol was added to the resulting mixture and was stirred to obtain a one-package system cold-setting type transparent acrylic clear varnish having viscosity of less than $10^3$ centipoise. 0.2 Part of a 10% solution of NaOH in methanol added to 100 parts of the above clear varnish. To the resulting mixture was added a mixed solvent of 75% of toluene and 25% of n-butanol (referred to as Mixed Solvent (S)) so that non-volatile matter amounts to 30%. The clear varnish as coated by means of dipping on a piece of mild steel plate (50×150×0.8 mm) polished by sand paper No. 240. The coated steel was placed in a thermo-hydrostat in which the relative humidity (RH) was maintained at 70% RH and the temperature was maintained at 30° C. and was kept therein for one hour.

For comparison, the above procedure was repeated except that the clear varnish not containing NaOH solution was used in place of Composition. The samples coated by the present composition and the control composition were observed. The surface of sample coated by the control composition turned brown, whereas surface of sample coated by the present composition caused no discoloration.

The clear varnish of this invention and the control composition were tested at 30° C.—80% RH and 30° C.—90% RH. The results are shown in Table 1.

EXAMPLE 2

1 Part of a 10% solution KOH in ethanol was added to 100 parts of the clear varnish of Example 1. The mixture was stirred. Mixed solvent consisting of 50 parts of xylene, 10 parts of n-butanol, 20 parts of isopropanol, 10 parts of methyl ethyl ketone and 10 parts of ethylene glycol monobutyl ether was prepared. Viscosity of the clear varnish was adjusted to 16 seconds by Ford cup No. 4 by adding the mixed solvent to the clear varnish. The resulting varnish is referred to as Clear Varnish A. Clear Varnish A was sprayed on the mild steel plate of Example 1. The samples were tested at 30° C.—70% RH, 30° C.—80% RH or 30° C.—90% RH. The results are shown in Table 1.

For comparison, Clear Varnish not containing a KOH solution as prepared according to the above procedure. The resulting varnish is referred to as Clear Varnish B. Clear Varnish B was coated on the mild steel and was tested as mentioned above. The results are shown in Table 1.

Each of Clear Varnish A and Clear Varnish B was sprayed on Bonderite #144 steel (50 mm × 150 mm × 0.8 mm). And dried at room temperature for 15 minutes and then dried at 100° C. for 20 minutes. A variety of tests on physical properties of coating film were effected by using each of the two coated steels. The results are shown in Table 2.

EXAMPLE 3

An LiOH solution was prepared by adding 1 part of LiOH to 99 parts of ethanol. 5 Parts of the resulting LiOH solution was added to 100 parts of clear varnish of Example 1. The mixture was stirred sufficiently. Mixed solvent consisting of 75 parts of toluene and 25 parts of n-butanol was added to the clear varnish so that non-volatile matter therein amounts to 30%. The resulting clear varnish was tested as mentioned in Example 1. The results are shown in Table 1.

For comparison, clear varnish not containing an LiOH solution was prepared and tested in the same way. The results are shown in Table 1.

TABLE 1

| Ex. No. | | 30° C. - 70% RH | 30° C. - 80% RH | 30° C. - 90% RH |
|---|---|---|---|---|
| Ex. 1 | containing NaOH | ⊙ | ⊙ | O |
| | not containing NaOH | X | X | X |
| Ex. 2 | containing KOH | ⊙ | ⊙ | ⊙ |
| | not containing KOH | X | X | X |
| Ex. 3 | containing LiOH | ⊙ | ⊙ | O |
| | not containing LiOH | X | X | X |

Discoloration scale
⊙ no discoloration
O partial discoloration
Δ overall faint discoloration
X significant discoloration

TABLE 2

| Test Item | | Clear varnish A containing KOH | Clear varnish B not containing KOH |
|---|---|---|---|
| Thickness of coating film (μm) | | 25–33 | 24–34 |
| Impact test (½ inch, g-cm) | | 500 g - 10 cm | 500 g - 10 cm |
| Erichsen test (mm) | | > 7 | > 7 |
| Bending test (φ mm) | | < 3 | < 3 |
| Pencil hardness (Mitsubishi Uni) | | 2H | 2H |
| Adhesion | | 100/100 | 100/100 |
| Solvent resistance (24 hrs) | gasoline | ⊙ | ⊙ |
| | toluene | O | O |
| Chemical resistance (24 hrs) | 5% NaOH | | |
| Boil cooker resistance | 5% H$_2$SO$_4$ | ⊙ | ⊙ |

TABLE 2-continued

| Test Item | Clear varnish A containing KOH | Clear varnish B not containing KOH |
| --- | --- | --- |
| (7 hrs) | ◉ | ◉ |
| Warm water resistance (50° C. 7 days) | O | ◉ |
| Water resistance (7 days) | ◉ | ◉ |
| Salt spray resistance (7 days) | O | O |
| Moisture resistance (7 days in humidity cabinet) | ◉ | ◉ | resistance scale
◉ high
O slightly poor
Δ poor
X very poor

EXAMPLE 4

Into a 3000 ml four-necked flask equipped with stirrer, partial condenser, nitrogen-introducing glass tube and temperture-controlling thermocouple were introduced 528.00 parts of neopentyl glycol and 259.15 parts of isophthalic acid. The contents were heated by mantle heater, and thereafter, the oxygen in the flask was purged with nitrogen (50–100 ml/minute) with stirring. While maintaining the temperature at 200° C., the reaction was allowed to proceed. Whe about 28 parts of water were formed, the temperature lowered to 180° C. To the mixture was added 299.69 parts of trimellitic anhydride and the reaction was allowed to proceed for 1.5 hours at 180° C. to botain an alkyd resin having an acid value of 80 and molecular weight of 550. 150 parts of the resulting resin was diluted with 75 parts of a mixed solvent of 75% of toluene and 25% of n-butanol. To the resin solution as added 26.98 parts of acetylacetone with stirring. To the resulting resin solution was added 110.46 parts of a 30% solution of aluminum alkoxide dicomplex produced by reacting one mole of aluminum isopropoxide with two moles of ethyl acetoacetate in isopropyl alcohol to form a one-package system cold-setting type alkyd clear varnish.

3 Parts of a 10% NaOH solution in methanol was added to 100 parts of the resulting clear varnish. Mixed solvent consisting of 75 parts of toluene and 25 parts of n-butanol was added to the clear varnish so that non-volatile matter therein amounts to 30%. The resulting varnish was coated on the mild steel plate by dipping means in the same way as in Example 1. The coated plates were tested in thermo-hygrostat as shown in Table 3 for 1 hr. The results are shown in Table 3. For comparison clear varnish not containing NaOH was prepared and test according to the above procedure. The results are shown in Table 3.

EXAMPLE 5

8 Parts of a 10% KOH solution was added to 100 parts of alkyd clear varnish of Example 4. The mixture was stirred sufficiently. Mixed solvent consisting of 75 parts of toluene and 25 parts of n-butanol was added to the resulting varnish so that non-volatile matter therein amounts to 30%. The varnish was coated on the mild steel plate in the same way as in Example 1. For comparison, varnish not containing was prepared and test according to the above procedure. The results are shown in Table 3.

TABLE 3

| Example No. | | 30° C. - 70% RH | 30° C. - 80% RH | 30° C. - 90% RH |
| --- | --- | --- | --- | --- |
| Ex. 4 | containing NaOH | ◉ | ◉ | ◉ |
| | not containing NaOH | X | X | X |
| Ex. 5 | containing KOH | ◉ | ◉ | ◉ |
| | not containing KOH | X | X | X |

Discoloration scale
◉ no discoloration
O partial discoloration
Δ overall faint discoloration
X significant discoloration

What is claimed is:

1. A one-package system cold-setting type coating composition which comprises (i) an acrylic copolymer having carboxyl groups in its molecule or an alkyd resin, (ii) an aluminum alkoxide complex, (iii) a keto-enol tautomeric compound, (iv) a solvent and (v) from about 0.01 to about 1.0 percent by weight of at least one alkali metal hydroxide based on the weight of the composition comprising (i), (ii), (iii) and (iv).

2. The composition as defined in claim 1 wherein the alkali metal hydroxide is selected from the group consisting of lithium hydroxide, sodium hydroxide and potassium hydroxide.

3. The composition as defined in claim 1 wherein the alkali metal hydroxide is used in amount of about 0.05 to about 0.5 percent by weight of the composition comprising (i), (ii), (iii) and (iv).

4. The composition as defined in claim 1 wherein the keto-enol tautomeric compound as a stabilizer is acetyl acetone.

* * * * *